US012589878B1

(12) United States Patent
Clark et al.

(10) Patent No.: US 12,589,878 B1
(45) Date of Patent: Mar. 31, 2026

(54) HYBRID-ELECTRIC AIRCRAFT PROPULSION SYSTEM

(71) Applicant: RTX Corporation, Farmington, CT (US)

(72) Inventors: Thomas E. Clark, Wells, ME (US); John Akin, Charlotte, NC (US); Jung Muk Choe, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/036,722

(22) Filed: Jan. 24, 2025

(51) Int. Cl.
$B64D\ 27/33$      (2024.01)
$F02C\ 7/32$      (2006.01)

(52) U.S. Cl.
CPC ............... *B64D 27/33* (2024.01); *F02C 7/32* (2013.01); *F05D 2220/323* (2013.01); *F05D 2220/76* (2013.01); *F05D 2260/40311* (2013.01)

(58) Field of Classification Search
CPC ..... B64D 27/33; F02C 7/32; F05D 2220/323; F05D 2220/76; F05D 2260/40311
See application file for complete search history.

(56) References Cited

U.S. PATENT DOCUMENTS

| | | | | |
|---|---|---|---|---|
| 7,168,913 | B2 * | 1/2007 | Lardellier | ................. F02C 7/32 415/70 |
| 7,481,062 | B2 * | 1/2009 | Gaines | ................ F16H 37/0826 60/793 |
| 10,263,552 | B2 * | 4/2019 | Noderer | .............. H02P 29/0016 |
| 10,718,271 | B2 * | 7/2020 | Kupratis | ................. F01D 15/10 |
| 10,807,724 | B2 | 10/2020 | Klonowski | |
| 11,168,617 | B2 * | 11/2021 | Kupratis | .............. H02K 7/1823 |
| 11,193,425 | B2 * | 12/2021 | Hanrahan | ................. F02C 7/36 |
| 11,408,340 | B2 * | 8/2022 | Lefebvre | .................. F02K 5/00 |
| 11,448,138 | B2 * | 9/2022 | Romero | ............... F04D 19/026 |
| 11,454,172 | B2 | 9/2022 | Sridharan | |
| 11,708,792 | B2 * | 7/2023 | Lefebvre | .............. B64D 27/357 60/331 |
| 11,725,580 | B2 * | 8/2023 | Muldoon | ................ F01D 25/02 60/39.281 |
| 12,065,973 | B2 | 8/2024 | Kupratis | |
| 2007/0222220 | A1 * | 9/2007 | Huang | .................... F02N 11/04 290/31 |
| 2013/0247539 | A1 * | 9/2013 | Hoppe | ....................... F02C 7/32 60/39.15 |
| 2018/0149091 | A1 * | 5/2018 | Howell | .................. B64D 27/12 |
| 2018/0266329 | A1 * | 9/2018 | Mackin | ................. H02K 16/00 |

(Continued)

*Primary Examiner* — Pedro J Cuevas
(74) *Attorney, Agent, or Firm* — Getz Balich LLC

(57) ABSTRACT

An aircraft propulsion system includes a gas turbine engine, an electric machine, and a drive train. The gas turbine engine includes a first spool and a second spool. The electric machine includes a first rotor and a second rotor. The first rotor and the second rotor are concentric about a first axis. The drive train couples the first spool with the first rotor. The drive train is configured to couple the second spool with the second rotor. The drive train includes a tower shaft, a drive shaft, and an angled gear box. The tower shaft is coupled with the first spool. The tower shaft rotatable about a second axis. The drive shaft is operably coupled with the first rotor. The drive shaft is rotatable about a third axis transverse to the second axis. The angled gear box couples the tower shaft with the drive shaft.

20 Claims, 8 Drawing Sheets

(56)         References Cited

U.S. PATENT DOCUMENTS

| | | | |
|---|---|---|---|
| 2019/0052207 A1* | 2/2019 | Noderer | H02P 9/04 |
| 2019/0368424 A1* | 12/2019 | Kupratis | F02C 7/36 |
| 2020/0055610 A1* | 2/2020 | Terwilliger | H02J 7/1446 |
| 2020/0240331 A1* | 7/2020 | Kupratis | F01D 15/12 |
| 2020/0400078 A1* | 12/2020 | Hanrahan | F16H 48/08 |
| 2021/0355870 A1* | 11/2021 | Lefebvre | F02C 7/32 |
| 2022/0205394 A1* | 6/2022 | Kupratis | F02C 7/32 |
| 2022/0403776 A1* | 12/2022 | Muldoon | B64D 35/022 |
| 2023/0064177 A1* | 3/2023 | Lefebvre | B64D 35/023 |
| 2023/0387750 A1* | 11/2023 | Gover | F01D 15/10 |
| 2024/0401538 A1* | 12/2024 | Kupratis | F01D 25/36 |
| 2025/0223925 A1* | 7/2025 | Clark | F16H 37/065 |
| 2025/0326491 A1* | 10/2025 | Clark | B64D 27/33 |
| 2025/0326492 A1* | 10/2025 | Clark | F01D 15/10 |

* cited by examiner

HYBRID-ELECTRIC AIRCRAFT PROPULSION SYSTEM

BACKGROUND

1. Technical Field

This disclosure relates generally to aircraft propulsion systems and, more particularly, to electrical systems for hybrid-electric propulsion systems.

2. Background Information

Gas turbine engines for hybrid-electric aircraft propulsion systems may frequently include two or more rotatable spools and an electrical system. Various electrical system configurations are known for integrating an electrical system (e.g., electric machines) with these rotatable spools. While these known systems may be suitable for their intended purposes, there is room in the art for improvement.

SUMMARY

According to an aspect of the present disclosure, an aircraft propulsion system includes a gas turbine engine and an electrical system. The gas turbine engine includes a high-pressure (HP) spool and a low-pressure (LP) spool. The electrical system includes a consolidated electric machine and a drive train. The consolidated electric machine includes a first electric machine rotor and a second electric machine rotor. The first electric machine rotor and the second electric machine rotor are concentric and rotatable about an electric machine rotational axis of the consolidated electric machine. The drive train couples the HP spool with the first electric machine rotor. The drive train is configured to couple the LP spool with the second electric machine rotor. The drive train includes a first tower shaft, a first drive shaft, and a first angled gear box. The first tower shaft is coupled with the HP spool. The first tower shaft rotatable about a first tower shaft rotational axis. The first drive shaft is operably coupled with the first electric machine rotor. The first drive shaft is rotatable about a first drive shaft axis transverse to the first tower shaft rotational axis. The first angled gear box includes a first angled gear assembly coupling the first tower shaft with the first drive shaft.

In any of the aspects or embodiments described above and herein, the drive train may include a second tower shaft, a second drive shaft, and a second angled gear box, the second tower shaft may be coupled with the LP spool, the second tower shaft may be rotatable about a second tower shaft rotational axis, the second drive shaft may be operably coupled with the second electric machine rotor, the second drive shaft may be rotatable about a second drive shaft axis transverse to the second tower shaft rotational axis, and the second angled gear box may include a second angled gear assembly coupling the second tower shaft with the second drive shaft.

In any of the aspects or embodiments described above and herein, the drive train may further include an accessory gear box, the accessory gear box may include an accessory gear assembly, the accessory gear assembly may couple the first drive shaft with the first electric machine rotor, and the accessory gear assembly may couple the second drive shaft with the second electric machine rotor.

In any of the aspects or embodiments described above and herein, the first drive shaft may extend between and to the first angled gear box and the first electric machine rotor along the first drive shaft rotational axis and the electric machine rotational axis.

In any of the aspects or embodiments described above and herein, the drive train may further include a second tower shaft concentric with the first tower shaft, the second tower shaft may be rotatable about the first tower shaft rotational axis, the second tower shaft may be coupled with the LP spool, and the first angled gear assembly may operably couple the second tower shaft with the second electric machine rotor.

In any of the aspects or embodiments described above and herein, the first angled gear assembly may include a first input bevel gear, a second input bevel gear, a first output bevel gear, and a second output bevel gear, the first input bevel gear and the second input bevel gear may be rotatable about the first tower shaft rotational axis, the first input bevel gear may be coupled with the first tower shaft, the first input bevel gear may be engaged with the first output bevel gear, the second input bevel gear may be coupled with the second tower shaft, the second input bevel gear may be engaged with the second output bevel gear, the first output bevel gear and the second output bevel gear may be rotatable about the first drive shaft rotational axis, the first output bevel gear may be coupled with the first drive shaft, the second output bevel gear may be coupled with a shaft operably coupled with the second electric machine rotor, and the shaft may be concentric with the first drive shaft.

In any of the aspects or embodiments described above and herein, the drive train may further include a second drive shaft coupled with the second electric machine rotor, the second drive shaft may extend between and to the first angled gear box and the second electric machine rotor, and the first angled gear assembly may couple the second tower shaft with the second drive shaft.

In any of the aspects or embodiments described above and herein, the second drive shaft may be concentric with the first drive shaft and rotatable about the first drive shaft rotational axis, and the second drive shaft may extend between and to the first angled gear box and the second electric machine rotor along the first drive shaft rotational axis and the electric machine rotational axis.

In any of the aspects or embodiments described above and herein, the drive train may further include an input shaft, an output shaft, and a transmission, the angled gear assembly may couple the input shaft with the second tower shaft, the output shaft may be coupled with the second electric machine rotor, and the transmission may couple the input shaft with the output shaft.

In any of the aspects or embodiments described above and herein, the input shaft and the output shaft may be concentric with the first drive shaft and rotatable about the first drive shaft rotational axis.

In any of the aspects or embodiments described above and herein, the transmission may be a switching transmission operable in a first condition and a second condition, in the first condition the switching transmission may couple the input shaft with the output shaft, and in the second condition the switching transmission may couple the first drive shaft with the output shaft.

In any of the aspects or embodiments described above and herein, the transmission may be an epicyclic transmission coupling the input shaft with the output shaft.

According to another aspect of the present disclosure, an aircraft propulsion system includes a gas turbine engine and an electrical system. The gas turbine engine includes a high-pressure (HP) spool and a low-pressure (LP) spool. The electrical system includes a consolidated electric machine and a drive train. The consolidated electric machine includes a first electric machine rotor and a second electric machine rotor. The first electric machine rotor and the second electric machine rotor are concentric and rotatable about an electric machine rotational axis of the consolidated electric machine. The drive train couples the HP spool with the first electric machine rotor and couples the LP spool with the second electric machine rotor. The drive train includes a first tower shaft, a first drive shaft, an accessory gear box, and a first angled gear box. The first tower shaft is coupled with the HP spool. The first tower shaft is rotatable about a first tower shaft rotational axis transverse to the electric machine rotational axis. The first drive shaft is operably coupled with the first electric machine rotor. The first drive shaft is rotatable about a first drive shaft axis. The first drive shaft is disposed within the accessory gear box. The accessory gear box includes a gear box housing with the consolidated electric machine mounted thereon. The first angled gear box includes a first angled gear assembly coupling the first tower shaft with the first drive shaft.

In any of the aspects or embodiments described above and herein, the drive train may further include a second tower shaft concentric with the first tower shaft, the second tower shaft may be about the first tower shaft rotational axis, the second tower shaft may be coupled with the LP spool, and the angled gear assembly may operably couple the second tower shaft with the second electric machine rotor.

In any of the aspects or embodiments described above and herein, the drive train may further include a second drive shaft coupled with the second electric machine rotor, the second drive shaft may extend through the accessory gear box between and to the first angled gear box and the second electric machine rotor, and the first angled gear assembly may couple the second tower shaft with the second drive shaft.

In any of the aspects or embodiments described above and herein, the second drive shaft may be concentric with the first drive shaft and rotatable about the electric machine rotational axis, and the second drive shaft may extend between and to the first angled gear box and the second electric machine rotor along the electric machine rotational axis.

According to another aspect of the present disclosure, an aircraft propulsion system includes a gas turbine engine and an electrical system. The gas turbine engine includes a high-pressure (HP) spool and a low-pressure (LP) spool. The electrical system includes a consolidated electric machine and a drive train. The consolidated electric machine includes an inner electric machine rotor and an outer electric machine rotor. The inner electric machine rotor and the outer electric machine rotor are concentric and rotatable about an electric machine rotational axis of the consolidated electric machine. The outer electric machine rotor is disposed radially outward of the inner electric machine rotor relative to the electric machine rotational axis. The drive train couples the HP spool with the inner electric machine rotor. The drive train is configured to couple the LP spool with the outer electric machine rotor. The drive train includes a first tower shaft, a first drive shaft, a first angled gear box, a second tower shaft, and a second drive shaft. The first tower shaft is coupled with the HP spool. The first tower shaft is rotatable about a first tower shaft rotational axis. The first drive shaft is operably coupled with the inner electric machine rotor. The first drive shaft is rotatable about a first drive shaft axis transverse to the first tower shaft rotational axis. The first angled gear box includes a first angled gear assembly coupling the first tower shaft with the first drive shaft. The second tower shaft is coupled with the LP spool. The second tower shaft is rotatable about a second tower shaft rotational axis. The second drive shaft is operably coupled with the second tower shaft and the outer electric machine rotor. The second drive shaft is rotatable about a second drive shaft rotational axis transverse to the second tower shaft rotational axis.

In any of the aspects or embodiments described above and herein, the first angled gear assembly may couple the second tower shaft with the second drive shaft.

In any of the aspects or embodiments described above and herein, the first tower shaft rotational axis and the second tower shaft rotational axis may be colinear, and the first tower shaft and the second tower shaft may be concentric.

In any of the aspects or embodiments described above and herein, the drive train may further include a second angled gear box, the second angled gear box may include a second angled gear assembly, and the second angled gear assembly may couple the second tower shaft with the second drive shaft.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
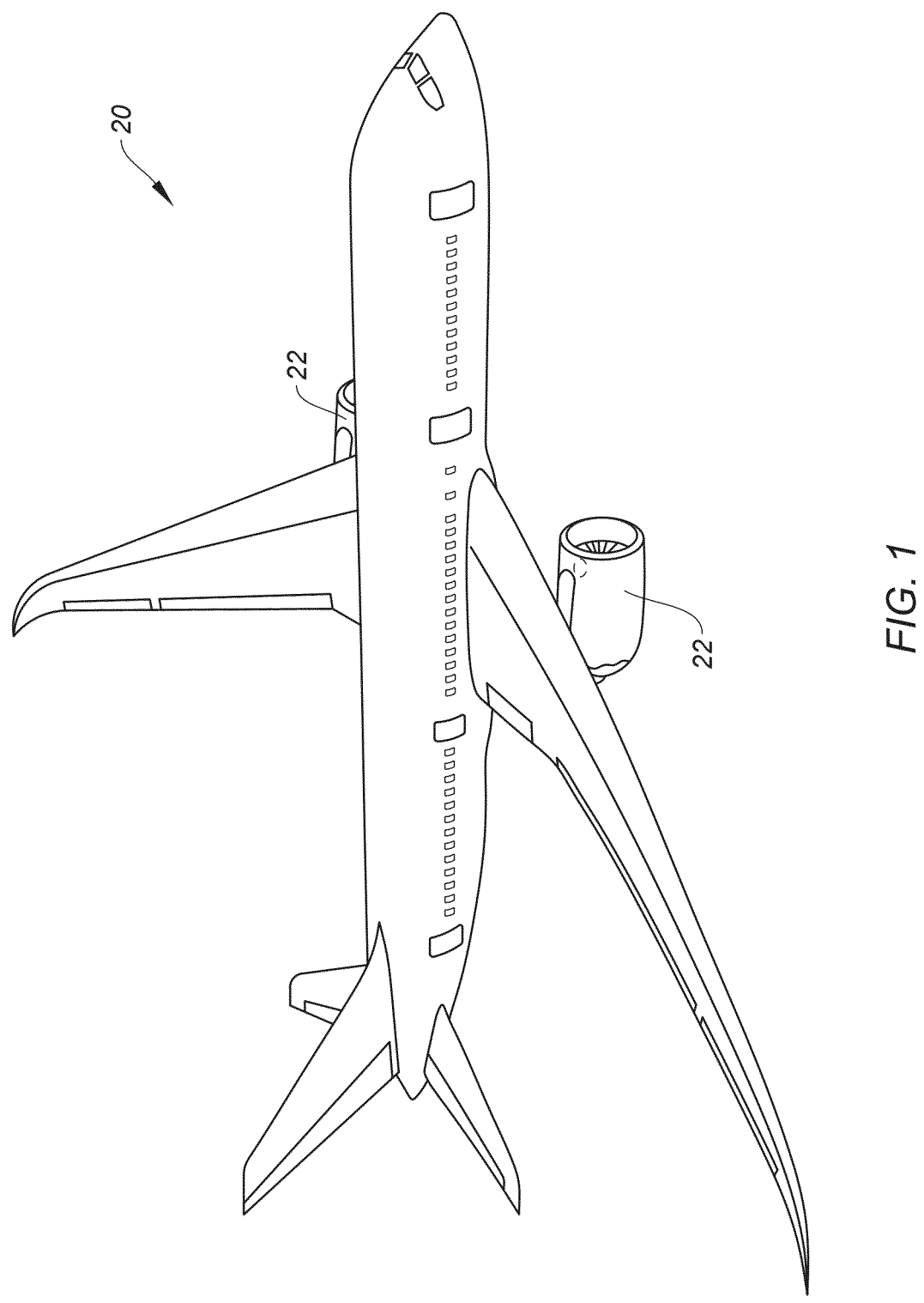
FIG. 1 illustrates a perspective view of an aircraft including a propulsion system, in accordance with one or more embodiments of the present disclosure.

FIG. 1 illustrates an aircraft 20 including a propulsion system 22. The aircraft 20 may be a fixed-wing aircraft (e.g., an airplane) as shown, for example, in FIG. 1. The aircraft 20 may alternatively be a rotary-wing aircraft (e.g., a helicopter), a tilt-rotor aircraft, a tilt-wing aircraft, or another aerial vehicle. Moreover, the aircraft 20 may be a manned aerial vehicle or an unmanned aerial vehicle (UAV, e.g., a drone).

Figure 2:
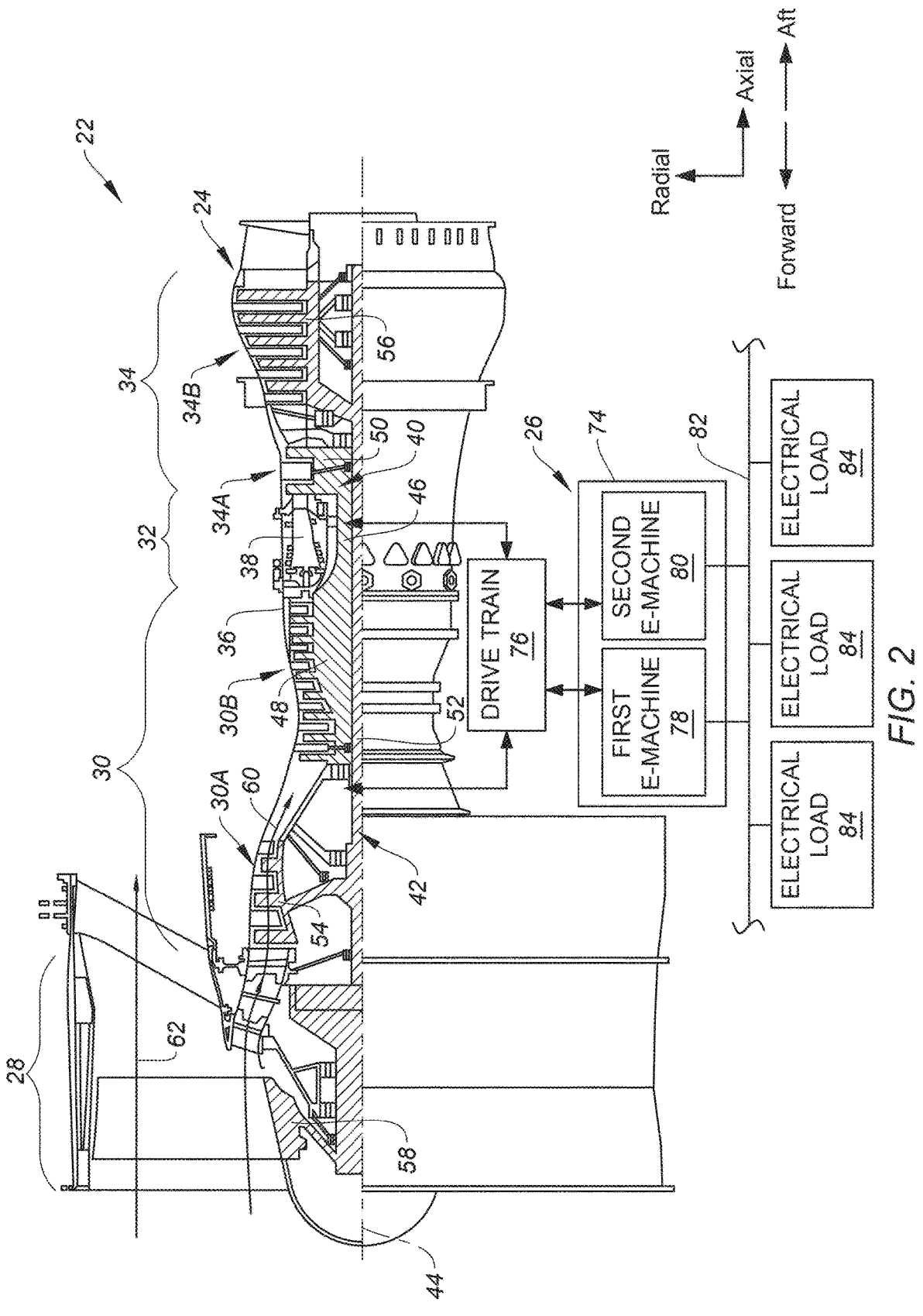
FIG. 2 schematically illustrates a cutaway, side view of a hybrid-electric aircraft propulsion system including a gas turbine engine and an electrical system, in accordance with one or more embodiments of the present disclosure.

FIG. 2 schematically illustrates a cutaway, side view of the propulsion system 22. The propulsion system 22 of FIG. 2 includes a gas turbine engine 24 and an electrical system 26. The gas turbine engine 24 of FIG. 2 is configured as a multi-spool, hybrid-electric turbofan gas turbine engine 24. However, while the following description and accompanying drawings may refer to the turbofan gas turbine engine 24 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 24 of FIG. 2 includes a fan section 28, a compressor section 30, a combustor section 32, a turbine section 34, and an engine static structure 36. The compressor section 30 includes a low-pressure compressor (LPC) 30A and a high-pressure compressor (HPC) 30B. The combustor section 32 includes a combustor 38 (e.g., an annular combustor). The turbine section 34 includes a high-pressure turbine (HPT) 34A and a low-pressure turbine (LPT) 34B.

Components of the fan section 28, the compressor section 30, and the turbine section 34 form a first rotational assembly 40 (e.g., a high-pressure (HP) spool) and a second rotational assembly 42 (e.g., a low-pressure (LP) spool) of the gas turbine engine 24. The first rotational assembly 40 and the second rotational assembly 42 are mounted for rotation about a rotational axis 44 (e.g., an axial centerline) of the gas turbine engine 24 relative to the engine static structure 36.

The first rotational assembly 40 includes a first shaft 46, a bladed first compressor rotor 48 for the high-pressure compressor 30B, and a bladed first turbine rotor 50 for the high-pressure turbine 34A. The first shaft 46 interconnects the bladed first compressor rotor 48 and the bladed first turbine rotor 50.

The second rotational assembly 42 includes a second shaft 52, a bladed second compressor rotor 54 for the low-pressure compressor 30A, a bladed second turbine rotor 56 for the low-pressure turbine 34B, and a bladed fan rotor 58 for the fan section 28. The second shaft 52 interconnects the bladed second compressor rotor 54 and the bladed second turbine rotor 56. The second shaft 52 may additionally interconnect the bladed fan rotor 58 with the bladed second compressor rotor 54 and the bladed second turbine rotor 56. Alternatively, the second shaft 52 may be coupled with the bladed fan rotor 58 by a gear assembly (e.g., a reduction gear box (RGB)). The first shaft 46 and the second shaft 52 are concentric and configured to rotate about the rotational axis 44. The present disclosure, however, is not limited to concentric configurations of the first shaft 46 and the second shaft 52.

The engine static structure 36 may include one or more engine cases, cowlings, bearing assemblies, inner fixed structures, and/or other non-rotating structures configured to house and/or support (e.g., rotationally support) components of the gas turbine engine sections 28, 30, 32, 34.

The electrical system 26 includes an electric machine assembly 74 and a drive train 76. The electric machine assembly 74 includes a first electric machine 78 (e.g., a high-pressure (HP) electric machine) and a second electric machine 80 (e.g., a low-pressure (LP) electric machine) consolidated together as a single, mechanical unit, as will be discussed in further detail. The first electric machine 78 is coupled with the first rotational assembly 40 (e.g., the first shaft 46) by the drive train 76. The second electric machine 80 is coupled with the second rotational assembly 42 (e.g., the second shaft 52) by the drive train 76. The first electric machine 78 and the second electric machine 80 are electrically connected with an electrical distribution system 82 of the propulsion system 22 and/or the aircraft 20. The first electric machine 78 and the second electric machine 80 may be electrically connected with the electrical distribution system 82 via one or more controllers (e.g., motor controller, generator controller, etc.) configured to manage a power input and/or output from the first electric machine 78 and/or the second electric machine 80. The controller(s) may be configured to convert output from the first electric machine 78 and the second electric machine 80 into useable power for the electrical distribution system 82. The controller(s) may be configured to receive power from the electrical distribution system 82 and cause the first electrical device 78 and/or the second electrical device 80 to convert the power into mechanical energy via the drive train 76. The first electric machine 78 and the second electric machine 80 may have associated therewith discrete controllers configured to control the individual electric machines. In at least one example, a single controller may be configured to control both the first electric machine and the second electric machine 80. The electrical distribution system 82 may be electrically connected with and configured to supply electrical power to electrical loads 84 of the propulsion system 22 and/or the aircraft 20 such as, but not limited to, environmental control systems, lighting systems, electronic communication systems, cockpit instrumentation, avionics systems, electric actuators, battery charging systems, and the like. The first electric machine 78 and the second electric machine 80 are configured as electric generators to facilitate generation of electrical power for the electrical distribution system 82. The first electric machine 78 and/or the second electric machine 80 may be further configured as motor-generators to facilitate driving rotation or otherwise assisting rotation of the first rotational assembly 40 and/or the second rotational assembly with the electric machine assembly 74.

In operation of the gas turbine engine 24, ambient air is directed through the fan section 28 and into a core flow path 60 (e.g., an annular flow path) and a bypass flow path 62 (e.g., an annular flow path) by rotation of the bladed fan rotor 58. Air flow along the core flow path 60 is compressed by the low-pressure compressor 30A and the high-pressure compressor 30B, mixed and burned with fuel in the combustor 38, and then directed through the high-pressure turbine 34A and the low-pressure turbine 34B. The bladed first turbine rotor 50 and the bladed second turbine rotor 56 rotationally drive the first rotational assembly 40 and the second rotational assembly 42, respectively, in response to the combustion gas flow through the high-pressure turbine 34A and the low-pressure turbine 34B. In some operating conditions, the first rotational assembly 40 and the second rotational assembly 42 may drive the first electric machine 78 and the second electric machine 80 to generate electrical power and supply the electrical power to the electrical distribution system 82. In some other operating conditions, the first electric machine 78 and/or the second electric machine 80 may be operated as an electric motor to apply rotational force to the first rotational assembly 40 and/or the second rotational assembly 42.

Figures 3, 4:
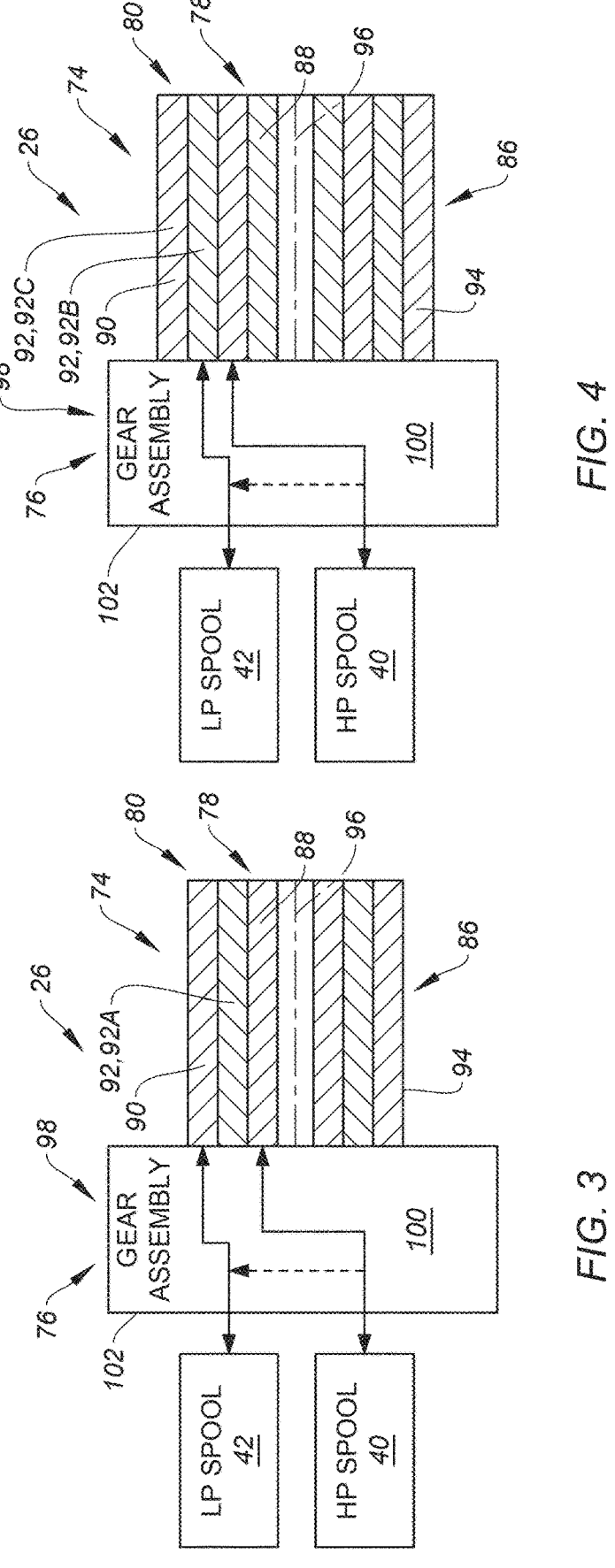
FIG. 3 schematically illustrates an electric machine assembly for the electrical system of FIG. 2, in accordance with one or more embodiments of the present disclosure.
FIG. 4 schematically illustrates another electric machine assembly for the electrical system of FIG. 2, in accordance with one or more embodiments of the present disclosure.

FIGS. 3 and 4 schematically illustrate embodiments of the electrical system 26 including the electric machine assembly 74 and the drive train 76. As previously discussed, the first electric machine 78 and the second electric machine 80 are consolidated together as a single, mechanical unit. The first electric machine 78 and second electric machine 80 form a concentric, dual rotor electric machine 86 of the electric machine assembly 74 (hereinafter the "consolidated electric machine" 86). The consolidated electric machine 86 includes a first rotor 88 of the first electric machine 78, a second rotor 90 of the second electric machine 80, at least one stator 92, and a machine housing 94. The first rotor 88 and the second rotor 90 are mounted for rotation about a rotational axis 96 of the consolidated electric machine 86. The first rotor 88 and the second rotor 90 are concentrically mounted relative to the rotational axis 96. The first rotor 88 of FIGS. 3 and 4 is an inner rotor (e.g., inner radial rotor) of the consolidated electric machine 86 and the second rotor 90 of FIGS. 3 and 4 is an outer rotor (e.g., outer radial rotor) of the consolidated electric machine 86. The present disclosure, however, is not limited to this foregoing exemplary configuration of the first rotor 88 and the second rotor 90, and the first rotor 88 and the second rotor 90 may alternatively be an outer rotor and an inner rotor of the consolidated electric machine 86, respectively. The consolidated electric machine 86 of FIG. 3 includes a single stator 92A, 92 shared by the first electric machine 78 and the second electric machine 80. The stator 92A is disposed radially between and adjacent the first rotor 88 and the second rotor 90. The consolidated electric machine 86 of FIG. 4 includes a first stator 92B, 92 of the first electric machine 78 and a second stator 92C, 92 of the second electric machine 80. The first stator 92B is disposed radially inward of and adjacent the first rotor 88 and the second stator 92C is disposed radially outward of and adjacent the second rotor 90. The second rotor 90 may rotate at a rate that is less than, equal to, or greater than the first rotor 88. In at least one example, the second rotor 90 (e.g., coupled to the second rotational assembly 42, low pressure spool) rotates at a rate that is less than the first rotor 88 (e.g., coupled to the first rotational assembly 40, high pressure spool). The present disclosure, however, is not limited to any particular stator 92 configuration of the consolidated electric machine 86.

The drive train 76 couples the first rotor 88 and the second rotor 90 with the first rotational assembly 40 and the second rotational assembly 42. For example, the drive train 76 of FIGS. 3 and 4 includes a gear box 98 including a gear assembly 100 and a gear box housing 102. The gear assembly 100 couples the first rotational assembly 40 with the first rotor 88. The gear assembly 100 may additionally be configured to selectively couple the first rotational assembly 40 with the second rotor 90, for example, to facilitate driving both the first rotor 88 and the second rotor 90 with the first rotational assembly 40. The gear assembly 100 couples the second rotational assembly 42 with the second rotor 90. The gear assembly 100 may be configured as or otherwise include a transmission, a speed change device, an epicyclic gear train, etc. The gear box housing 102 houses and supports the gear assembly 100. The consolidated electric machine 86 (e.g., the machine housing 94) may be mounted on the gear box 98 at (e.g., on, adjacent, or proximate) the gear box housing 102. The gear box 98 may be an accessory gear box (AGB) of the gas turbine engine 24 configured to additionally drive accessories such as pumps, air compressors, engine starters, and the like.

Figure 6:
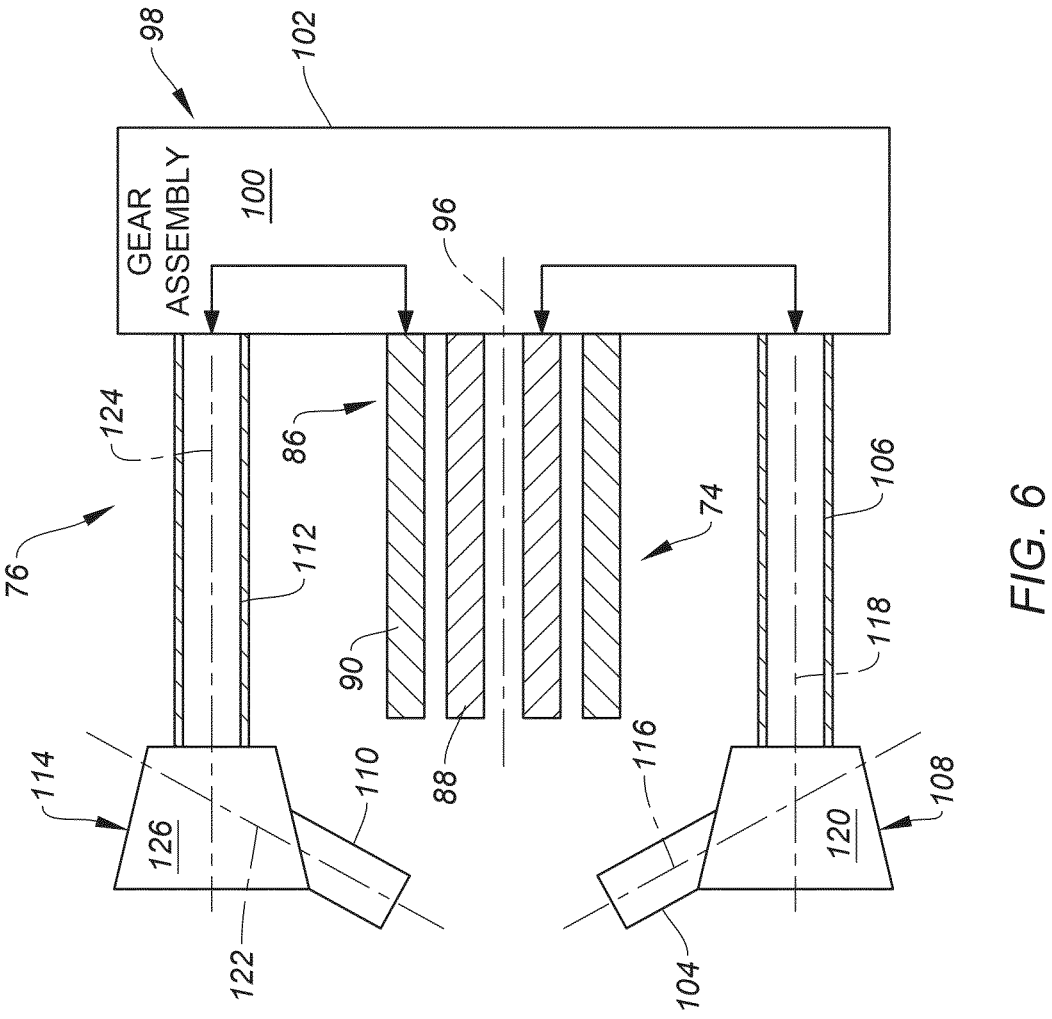
FIG. 6 schematically illustrates another view of the drive train of FIG. 5, in accordance with one or more embodiments of the present disclosure.
Figure 5:
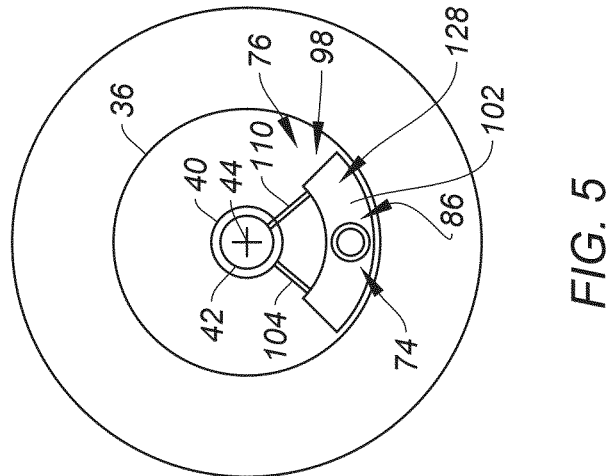
FIG. 5 schematically illustrates a cutaway view of a drive train for the electrical system on an axial plane of the gas turbine engine, in accordance with one or more embodiments of the present disclosure.

FIGS. 5 and 6 schematically illustrate an embodiment of the drive train 76. The drive train 76 of FIGS. 5 and 6 includes a first tower shaft 104, a first drive shaft 106, a first angled gear box 108, a second tower shaft 110, a second drive shaft 112, and a second angled gear box 114. The first tower shaft 104 is coupled with the first rotational assembly 40 (e.g., the first shaft 46). The first tower shaft 104 is rotatable about a first tower shaft axis 116. The first drive shaft 106 is coupled with the gear assembly 100. In particular, the gear assembly 100 couples the first drive shaft 106 with the first rotor 88. The first drive shaft 106 is rotatable about a first drive shaft axis 118. The first drive shaft axis 118 is oriented transverse (e.g., orthogonal, obliquely-angled, or otherwise non-parallel) to the first tower shaft axis 116. The first drive shaft 106 extends along the first drive shaft axis 118 between and to the gear box 98 and the first angled gear box 108. The first angled gear box 108 includes a first gear assembly 120 coupling the first tower shaft 104 and the first drive shaft 106. The second tower shaft 110 is coupled with the second rotational assembly 42 (e.g., the second shaft 52). The second tower shaft 110 is rotatable about a second tower shaft axis 122. The second drive shaft 112 is coupled with the gear assembly 100. In particular, the gear assembly 100 couples the second drive shaft 112 with the second rotor 90. The second drive shaft 112 is rotatable about a second drive shaft axis 124 (e.g., different than the first drive shaft axis 118). The second drive shaft axis 124 is oriented transverse (e.g., orthogonal, obliquely-angled, or otherwise non-parallel) to the second tower shaft axis 122. The second drive shaft 112 extends along the second drive shaft axis 124 between and to the gear box 98 and the second angled gear box 114. The second angled gear box 114 includes a second gear assembly 126 coupling the second tower shaft 110 and the second drive shaft 112. As shown in FIG. 5, the gear box 98 may be disposed radially outward of the first rotational assembly 40 and the second rotational assembly 42 within the engine static structure 36 (e.g., a core cowl of the gas turbine engine 24). The gear box 98 of FIG. 5 is illustrated at a bottom dead center (BDC) position of the gas turbine engine 24, however, the present disclosure is not limited to this particular position of the gear box 98. As shown in FIG. 5, the consolidated electric machine 86 may be disposed at (e.g., on, adjacent, or proximate) an axial end 128 of the gear box 98 (e.g., the gear box housing 102).

Figures 7, 8:
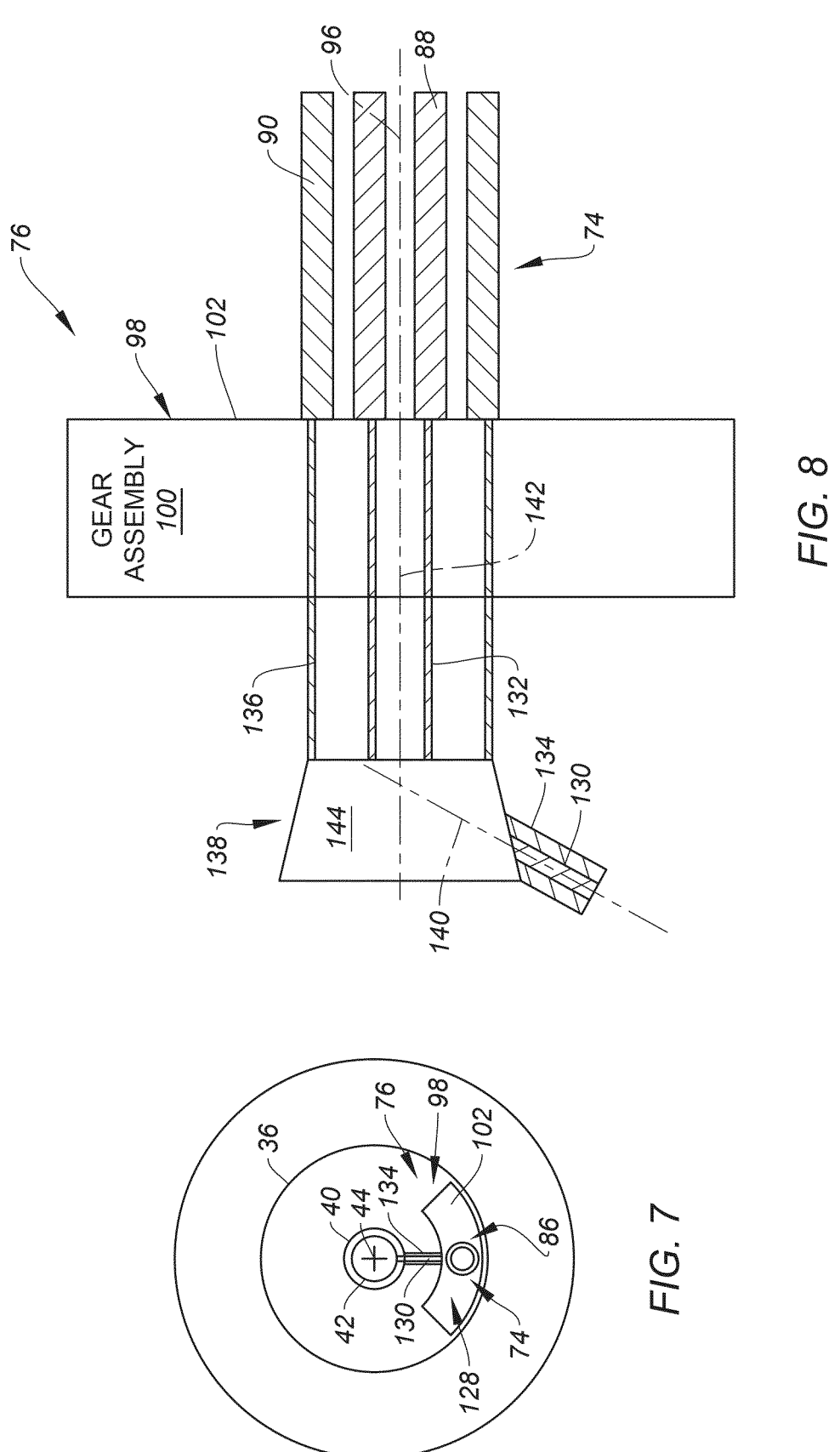
FIG. 7 schematically illustrates a cutaway view of another drive train for the electrical system on an axial plane of the gas turbine engine, in accordance with one or more embodiments of the present disclosure.
FIG. 8 schematically illustrates another view of the drive train of FIG. 7, in accordance with one or more embodiments of the present disclosure.

FIGS. 7 and 8 schematically illustrate another embodiment of the drive train 76. The drive train 76 of FIGS. 7 and 8 includes a first tower shaft 130, a first drive shaft 132, a second tower shaft 134, a second drive shaft 136, and an angled gear box 138. The first tower shaft 130 is coupled with the first rotational assembly 40 (e.g., the first shaft 46). The first tower shaft 130 is rotatable about a tower shaft axis 140. The first drive shaft 132 is coupled with the first rotor 88. As shown in FIG. 8, the first drive shaft 132 may have a direct drive configuration such that the first drive shaft 132 is directly connected to the first rotor 88 to drive rotation of the first rotor 88 at a same rotation speed as the first drive shaft 132. The first drive shaft 132 is rotatable about a drive shaft axis 142. The first drive shaft 132 may extend along the drive shaft axis 142 between and to the angled gear box 138 and the first rotor 88 through the gear box 98. The drive shaft axis 142 may be the same as (e.g., colinear with) the rotational axis 96 of the first rotor 88 and the second rotor 90. The drive shaft axis 142 is oriented transverse (e.g., orthogonal, obliquely-angled, or otherwise non-parallel) to the tower shaft axis 140. The second tower shaft 134 is coupled with the second rotational assembly 42 (e.g., the second shaft 52). The second tower shaft 134 is rotatable about the tower shaft axis 140. The second tower shaft 134 is concentric with the first tower shaft 130 about the tower shaft axis 140. For example, the first tower shaft 130 may be an inner (e.g., inner radial) tower shaft and the second tower shaft 134 may be an outer (e.g., outer radial) tower shaft. The second drive shaft 136 is coupled with the second rotor 90. As shown in FIG. 8, the second drive shaft 136 may have a direct drive configuration such that the second drive shaft 136 is directly connected to the second rotor 90 to drive rotation of the second rotor 90 at a same rotation speed as the second drive shaft 136. The second drive shaft 136 is rotatable about the drive shaft axis 142. The second drive shaft 136 is concentric with the first drive shaft 132 about the drive shaft axis 142. For example, the first drive shaft 132 may be an inner (e.g., inner radial) drive shaft and the second drive shaft 136 may be an outer (e.g., outer radial) drive shaft. The second drive shaft 136 may extend along the drive shaft axis 142 between and to the angled gear box 138 and the second rotor 90 through the gear box 98. The angled gear box 138 includes a gear assembly 144 coupling the first tower shaft 130 to the first drive shaft 132 and coupling the second tower shaft 134 to the second drive shaft 136. While the first drive shaft 132 and the second drive shaft 136 are illustrated in FIG. 8 with a direct drive configuration and the drive shaft axis 142 colinear with the rotational axis 96, the first drive shaft 132 and/or the second drive shaft 136 may alternatively be coupled with the first rotor 88 and/or the second rotor 90 by the gear assembly 100, for example, with a drive shaft axis different than the rotational axis 96.

Figure 9:
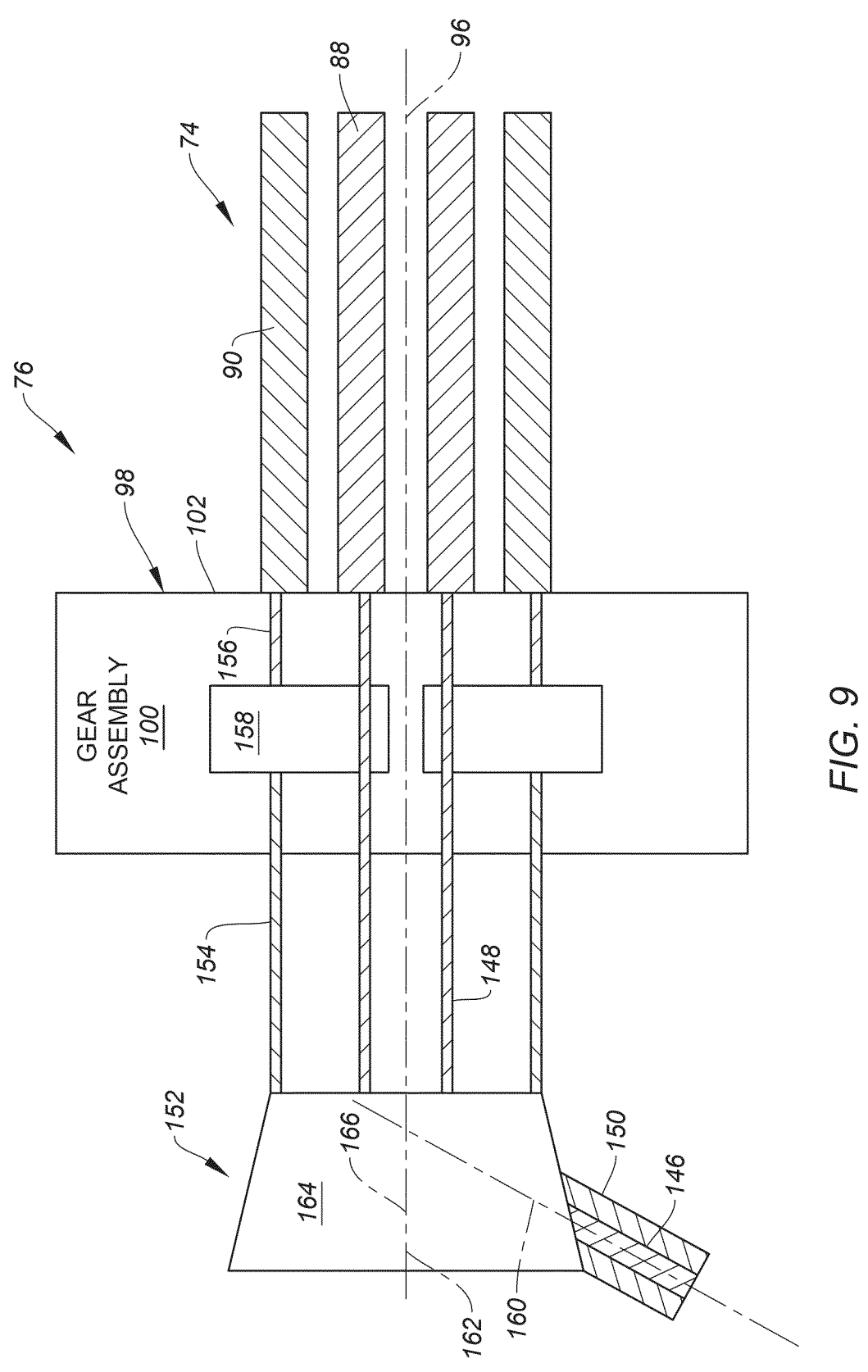
FIG. 9 schematically illustrates another drive train for the electrical system, in accordance with one or more embodiments of the present disclosure.

FIG. 9 schematically illustrates another embodiment of the drive train 76. The drive train 76 of FIG. 9 includes a first tower shaft 146, a first drive shaft 148, a second tower shaft 150, an angled gear box 152, an input shaft 154, an output shaft 156, and a switching transmission 158. The first tower shaft 146 is coupled with the first rotational assembly 40 (e.g., the first shaft 46). The first tower shaft 146 is rotatable about a tower shaft axis 160. The first drive shaft 148 is coupled with the first rotor 88. As shown in FIG. 9, the first drive shaft 148 may have a direct drive configuration such that the first drive shaft 148 is directly connected to the first rotor 88 to drive rotation of the first rotor 88 at a same rotation speed as the first drive shaft 148. The first drive shaft 148 is rotatable about a drive shaft axis 162. The first drive shaft 148 may extend along the drive shaft axis 162 between and to the angled gear box 152 and the first rotor 88 through the gear box 98. The drive shaft axis 162 may be the same as (e.g., colinear with) the rotational axis 96 of the first rotor 88 and the second rotor 90. The drive shaft axis 162 is oriented transverse (e.g., orthogonal, obliquely-angled, or otherwise non-parallel) to the tower shaft axis 160. The second tower shaft 150 is coupled with the second rotational assembly 42 (e.g., the second shaft 52). The second tower shaft 150 is rotatable about the tower shaft axis 160. The second tower shaft 150 is concentric with the first tower shaft 146 about the tower shaft axis 160. For example, the first tower shaft 146 may be an inner (e.g., inner radial) tower shaft and the second tower shaft 150 may be an outer (e.g., outer radial) tower shaft. The angled gear box 152 includes a gear assembly 164 coupling the first tower shaft 146 to the first drive shaft 148 and coupling the second tower shaft 150 to the input shaft 154. The input shaft 154 and the output shaft 156 are rotatable about a shaft axis 166. The shaft axis 166 may be the same as (e.g., colinear with) the drive shaft axis 162. The input shaft 154 extends along the shaft axis 166 between and to the angled gear box 152 and the switching transmission 158. The input shaft 154 couples the gear assembly 164 with the switching transmission 158. The output shaft 156 extends along the shaft axis 166 between and to the switching transmission 158 and the second rotor 90. The output shaft 156 couples the switching transmission 158 with the second rotor 90. The switching transmission 158 is configured to selectively couple the first drive shaft 148 or the input shaft 154 with the output shaft 156. The terms "input" and "output" are used herein for various input and output shafts with respect to a typical generating operation of the electric machines 78, 80 driven by the first rotational assembly 40 and/or the second rotational assembly 42. Of course, as previously discussed, the electric machines 78, 80 may alternatively be operated to apply rotational force to the first rotational assembly 40 and/or the second rotational assembly 42. The switching transmission 158 may be part of the gear box 98 or a discrete transmission assembly.

Figure 10:
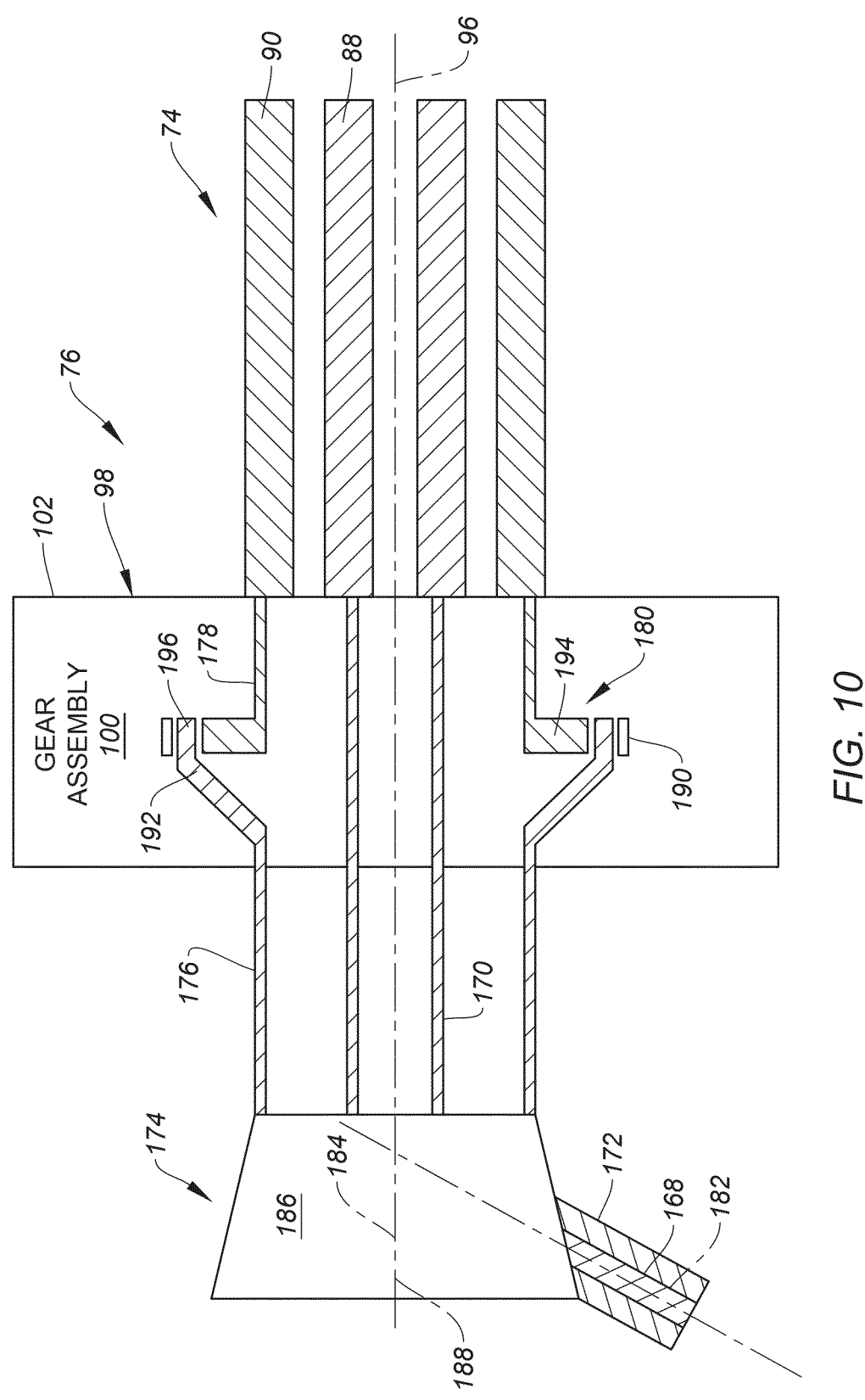
FIG. 10 schematically illustrates another drive train for the electrical system, in accordance with one or more embodiments of the present disclosure.

FIG. 10 schematically illustrates another embodiment of the drive train 76. The drive train 76 of FIG. 10 includes a first tower shaft 168, a first drive shaft 170, a second tower shaft 172, an angled gear box 174, an input shaft 176, an output shaft 178, and an epicyclic transmission 180. The first tower shaft 168 is coupled with the first rotational assembly 40 (e.g., the first shaft 46). The first tower shaft 168 is rotatable about a tower shaft axis 182. The first drive shaft 170 is coupled with the first rotor 88. As shown in FIG. 10, the first drive shaft 170 may have a direct drive configuration such that the first drive shaft 170 is directly connected to the first rotor 88 to drive rotation of the first rotor 88 at a same rotation speed as the first drive shaft 170. The first drive shaft 170 is rotatable about a drive shaft axis 184. The first drive shaft 170 may extend along the drive shaft axis 184 between and to the angled gear box 174 and the first rotor 88 through the gear box 98. The drive shaft axis 184 may be the same as (e.g., colinear with) the rotational axis 96 of the first rotor 88 and the second rotor 90. The drive shaft axis 184 is oriented transverse (e.g., orthogonal, obliquely-angled, or otherwise non-parallel) to the tower shaft axis 182. The second tower shaft 172 is coupled with the second rotational assembly 42 (e.g., the second shaft 52). The second tower shaft 172 is rotatable about the tower shaft axis 182. The second tower shaft 172 is concentric with the first tower shaft 168 about the tower shaft axis 182. For example, the first tower shaft 168 may be an inner (e.g., inner radial) tower shaft and the second tower shaft 172 may be an outer (e.g., outer radial) tower shaft. The angled gear box 174 includes a gear assembly 186 coupling the first tower shaft 168 to the first drive shaft 170 and coupling the second tower shaft 172 to the input shaft 176. The input shaft 176 and the output shaft 178 are rotatable about a shaft axis 188. The shaft axis 188 may be the same as (e.g., colinear with) the drive shaft axis 184. The input shaft 176 extends along the shaft axis 188 between and to the angled gear box 174 and the epicyclic transmission 180. The input shaft 176 couples the gear assembly 186 with the epicyclic transmission 180. The output shaft 178 extends along the shaft axis 188 between and to the epicyclic transmission 180 and the second rotor 90. The output shaft 178 couples the epicyclic transmission 180 with the second rotor 90. The epicyclic transmission 180 couples the input shaft 176 with the output shaft 178. The epicyclic transmission 180 of FIG. 10 includes, for example, a ring gear 190, a planet carrier 192, and a sun gear 194. The planet carrier 192 coupled with the input shaft 176. The planet carrier 192 includes a plurality of planet gears 196. Each of the planet gears 196 is engaged with (e.g., meshed with) the ring gear 190 and the sun gear 194. The sun gear 194 is coupled with the output shaft 178. The present disclosure, however, is not limited to the foregoing exemplary configuration of the epicyclic transmission 180. The epicyclic transmission 180 may be part of the gear box 98 or a discrete transmission assembly.

The configuration of the consolidated electric machine 86 including the concentric first and second electric machines 78, 80 facilitates a reduced footprint of the electrical system 26 within the propulsion system 22. This configuration also allows the use of a single machine housing and simplified lubrication system (e.g., relative to discrete electric machines), thereby reducing mechanical complexity, lubrication system external plumbing, and maintenance time. The concentric shaft configurations of the drive train 76 (see FIGS. 8-10) facilitate further reductions of the electrical system 26 footprint. For example, the concentric first and second tower shafts 130, 134, 146, 150, 168, 172 facilitate reduced size of the drive train 76 relative to at least some conventional drive trains including parallel tower shafts.

Figure 11:
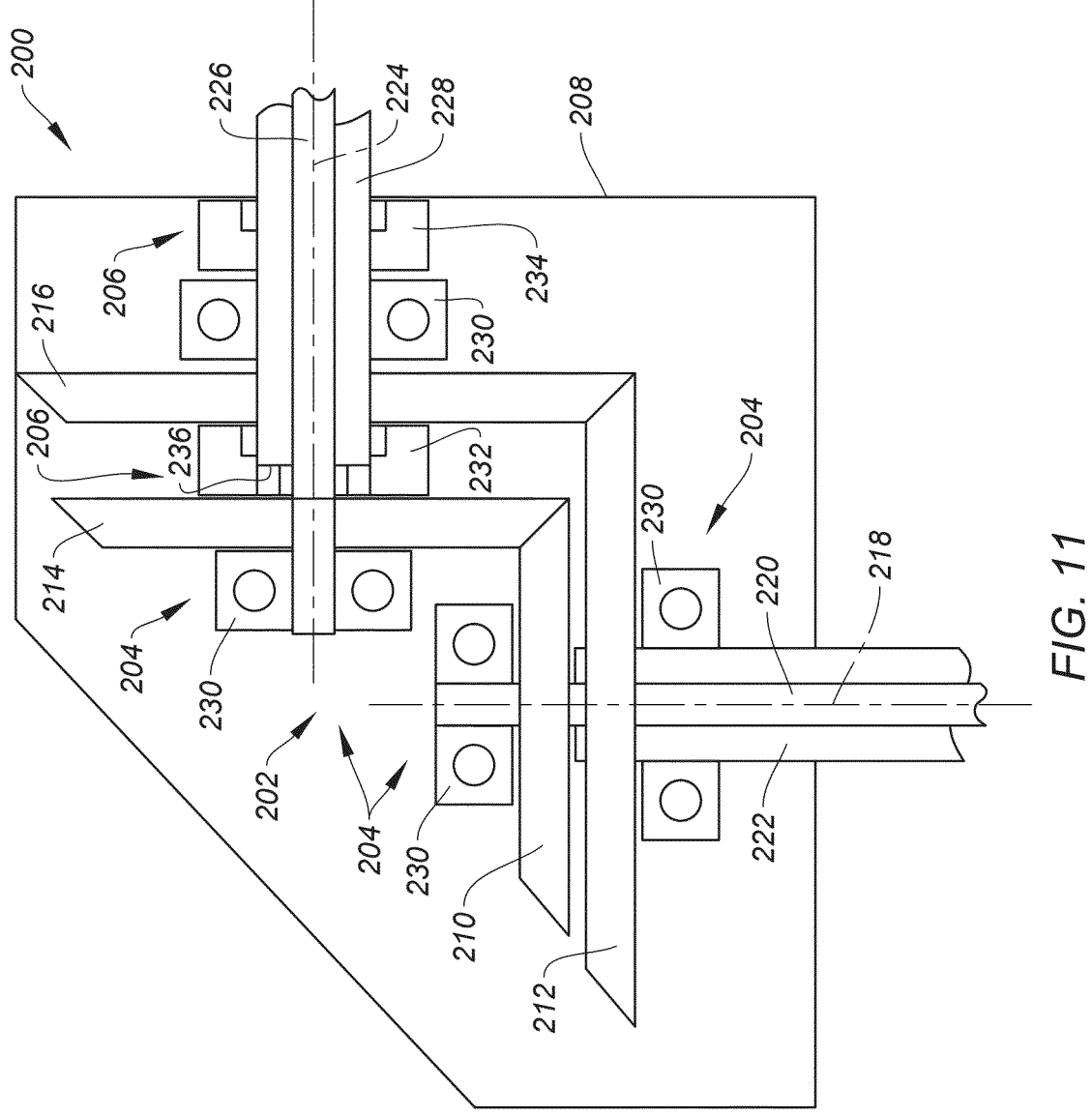
FIG. 11 schematically illustrates a cutaway view of an angle gear box for the electrical system drive train, in accordance with one or more embodiments of the present disclosure.

FIG. 11 schematically illustrates a cutaway view of an angled gear box 200 such as the angled gear boxes 138, 152, 174 (see FIGS. 8-10). Of course, the present disclosure is not limited to this foregoing exemplary configuration of the angled gear box 200 for the angled gear boxes 138, 152, 174. The angled gear box 200 includes a gear assembly 202, a bearing assembly 204, and a gear box housing 208. The angled gear box 200 may additionally include a seal assembly 206. The gear assembly 202 is configured to couple concentric input shafts rotatable about a first rotational axis with concentric output shafts rotatable about a different (e.g., transverse), second rotational axis. The gear assembly 202 includes a first input bevel gear 210, a second input bevel gear 212, a first output bevel gear 214, and a second output bevel gear 216. The first input bevel gear 210 and the second input bevel gear 212 are rotatable about an input rotational axis 218. The first input bevel gear 210 is coupled with a first input shaft 220 (e.g., the first tower shafts 130, 146, 168; see FIGS. 8-10), which first input shaft 220 may be coupled with the first rotational assembly 40 (e.g., the first shaft 46). The first input bevel gear 210 is mounted for rotation about the input rotational axis 218 with the first input shaft 220. The second input bevel gear 212 is coupled with a second input shaft 222 (e.g., the second tower shafts 134, 150, 172; see FIGS. 8-10), which second input shaft 222 may be coupled with the second rotational assembly 42 (e.g., the second shaft 52). The second input bevel gear 212 is mounted for rotation about the input rotational axis 218 with the second input shaft 222. The first output bevel gear 214 and the second output bevel gear 216 are rotatable about an output rotational axis 224. The input rotational axis 218 is oriented transverse (e.g., orthogonal, obliquely-angled, or otherwise non-parallel) to the output rotational axis 224. The first output bevel gear 214 is engaged with (e.g., meshed with) the first input bevel gear 210. The first output bevel gear 214 is coupled with a first output shaft 226 (e.g., the first drive shafts 132, 148, 170; see FIGS. 8-10), which first output shaft 226 may be directly or indirectly coupled with the first rotor 88. The first output bevel gear 214 is mounted for rotation about the output rotational axis 224 with the first output shaft 226. The second output bevel gear 216 is engaged with (e.g., meshed with) the second input bevel gear 212. The second output bevel gear 216 is coupled with a second output shaft 228 (e.g., the second drive shaft 136, the input shafts 154, 176; see FIGS. 8-10), which second output shaft 228 may be directly or indirectly coupled with the second rotor 90. The second output bevel gear 216 is mounted for rotation about the output rotational axis 224 with the second output shaft 228. The bearing assembly 204 includes a plurality of bearings 230 mounted at (e.g., on, adjacent, or proximate) the gear box housing 208 and rotatably supporting the first input shaft 220, the second input shaft 222, the first output shaft 226, and the second output shaft 228 within the gear box housing 208. The seal assembly 206 may include a first seal 232 and a second seal 234. The first seal 232 may be disposed at (e.g., on, adjacent, or proximate) an interface between the first output shaft 226 and the second output shaft 228. For example, the first seal 232 of FIG. 11 is disposed at (e.g., on, adjacent, or proximate) an axial end 236 of the second output shaft 228 axially between the first output bevel gear 214 and the second output bevel gear 216 (relative to the output rotational axis 224). The first seal 232 may be positioned in sealing contact with the first output shaft 226 and the second output shaft 228. The second seal 234 may be disposed at (e.g., on, adjacent, or proximate) an interface between the second output shaft 228 and the gear box housing 208. The second seal 234 may be positioned in sealing contact with the second output shaft 228. In some embodiments, the angled gear box 200 may not include the seal assembly 206. For example, in some embodiments, the angled gear box 200 may be in direct fluid communication with the gear box 98 (e.g., an accessory gear box), and fluid sealing facilitated by the seal assembly 206 may not be necessary. The gear box housing 208 houses and structurally supports the gear assembly 202, the bearing assembly 204, and the seal assembly 206.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:
a gas turbine engine including a high-pressure (HP) spool and a low-pressure (LP) spool; and
an electrical system including a consolidated electric machine and a drive train,
the consolidated electric machine including a first electric machine rotor and a second electric machine rotor, the first electric machine rotor and the second electric machine rotor concentric and rotatable about an electric machine rotational axis of the consolidated electric machine, and
the drive train coupling the HP spool with the first electric machine rotor, the drive train configured to couple the LP spool with the second electric machine rotor, the drive train including a first tower shaft, a first drive shaft, and a first angled gear box, the first tower shaft coupled with the HP spool, the first tower shaft rotatable about a first tower shaft rotational axis, the first drive shaft operably coupled with the first electric machine rotor, the first drive shaft rotatable about a first drive shaft axis transverse to the first tower shaft rotational axis, the first angled gear box including a first angled gear assembly coupling the first tower shaft with the first drive shaft.

2. The aircraft propulsion system of claim 1, wherein the drive train includes a second tower shaft, a second drive shaft, and a second angled gear box, the second tower shaft is coupled with the LP spool, the second tower shaft is rotatable about a second tower shaft rotational axis, the second drive shaft is operably coupled with the second electric machine rotor, the second drive shaft is rotatable about a second drive shaft axis transverse to the second tower shaft rotational axis, and the second angled gear box includes a second angled gear assembly coupling the second tower shaft with the second drive shaft.

3. The aircraft propulsion system of claim 2, wherein the drive train further includes an accessory gear box, the accessory gear box includes an accessory gear assembly, the accessory gear assembly couples the first drive shaft with the first electric machine rotor, and the accessory gear assembly couples the second drive shaft with the second electric machine rotor.

4. The aircraft propulsion system of claim 1, wherein the first drive shaft extends between and to the first angled gear box and the first electric machine rotor along the first drive shaft rotational axis and the electric machine rotational axis.

5. The aircraft propulsion system of claim 1, wherein the drive train further includes a second tower shaft concentric with the first tower shaft, the second tower shaft rotatable about the first tower shaft rotational axis, the second tower shaft is coupled with the LP spool, and the first angled gear assembly operably couples the second tower shaft with the second electric machine rotor.

6. The aircraft propulsion system of claim 5, wherein the first angled gear assembly includes a first input bevel gear, a second input bevel gear, a first output bevel gear, and a second output bevel gear, the first input bevel gear and the second input bevel gear are rotatable about the first tower shaft rotational axis, the first input bevel gear is coupled with the first tower shaft, the first input bevel gear is engaged with the first output bevel gear, the second input bevel gear is coupled with the second tower shaft, the second input bevel gear is engaged with the second output bevel gear, the first output bevel gear and the second output bevel gear are rotatable about the first drive shaft rotational axis, the first output bevel gear is coupled with the first drive shaft, the second output bevel gear is coupled with a shaft operably coupled with the second electric machine rotor, and the shaft is concentric with the first drive shaft.

7. The aircraft propulsion system of claim 5, wherein the drive train further includes a second drive shaft coupled with the second electric machine rotor, the second drive shaft extends between and to the first angled gear box and the second electric machine rotor, and the first angled gear assembly couples the second tower shaft with the second drive shaft.

8. The aircraft propulsion system of claim 7, wherein the second drive shaft is concentric with the first drive shaft and rotatable about the first drive shaft rotational axis, and the second drive shaft extends between and to the first angled gear box and the second electric machine rotor along the first drive shaft rotational axis and the electric machine rotational axis.

9. The aircraft propulsion system of claim 5, wherein the drive train further includes an input shaft, an output shaft, and a transmission, the angled gear assembly couples the input shaft with the second tower shaft, the output shaft is coupled with the second electric machine rotor, and the transmission couples the input shaft with the output shaft.

10. The aircraft propulsion system of claim 9, wherein the input shaft and the output shaft are concentric with the first drive shaft and rotatable about the first drive shaft rotational axis.

11. The aircraft propulsion system of claim 9, wherein the transmission is a switching transmission operable in a first condition and a second condition, in the first condition the switching transmission couples the input shaft with the output shaft, and in the second condition the switching transmission couples the first drive shaft with the output shaft.

12. The aircraft propulsion system of claim 9, wherein the transmission is an epicyclic transmission coupling the input shaft with the output shaft.

13. An aircraft propulsion system comprising:

a gas turbine engine including a high-pressure (HP) spool and a low-pressure (LP) spool; and an electrical system including a consolidated electric machine and a drive train, the consolidated electric machine including a first electric machine rotor and a second electric machine rotor, the first electric machine rotor and the second electric machine rotor concentric and rotatable about an electric machine rotational axis of the consolidated electric machine, and the drive train coupling the HP spool with the first electric machine rotor and coupling the LP spool with the second electric machine rotor, the drive train including a first tower shaft, a first drive shaft, an accessory gear box, and a first angled gear box, the first tower shaft coupled with the HP spool, the first tower shaft rotatable about a first tower shaft rotational axis transverse to the electric machine rotational axis, the first drive shaft operably coupled with the first electric machine rotor, the first drive shaft rotatable about a first drive shaft axis, the first drive shaft disposed within the accessory gear box, the accessory gear box including a gear box housing having the consolidated electric machine mounted thereon, the first angled gear box including a first angled gear assembly coupling the first tower shaft with the first drive shaft.

14. The aircraft propulsion system of claim 13, wherein the drive train further includes a second tower shaft concentric with the first tower shaft, the second tower shaft rotatable about the first tower shaft rotational axis, the second tower shaft is coupled with the LP spool, and the angled gear assembly operably couples the second tower shaft with the second electric machine rotor.

15. The aircraft propulsion system of claim 14, wherein the drive train further includes a second drive shaft coupled with the second electric machine rotor, the second drive shaft extends through the accessory gear box between and to the first angled gear box and the second electric machine rotor, and the first angled gear assembly couples the second tower shaft with the second drive shaft.

16. The aircraft propulsion system of claim 15, wherein the second drive shaft is concentric with the first drive shaft and rotatable about the electric machine rotational axis, and the second drive shaft extends between and to the first angled gear box and the second electric machine rotor along the electric machine rotational axis.

17. An aircraft propulsion system comprising:

a gas turbine engine including a high-pressure (HP) spool and a low-pressure (LP) spool; and an electrical system including a consolidated electric machine and a drive train, the consolidated electric machine including an inner electric machine rotor and an outer electric machine rotor, the inner electric machine rotor and the outer electric machine rotor concentric and rotatable about an electric machine rotational axis of the consolidated electric machine, the outer electric machine rotor disposed radially outward of the inner electric machine rotor relative to the electric machine rotational axis, and the drive train coupling the HP spool with the inner electric machine rotor, the drive train configured to couple the LP spool with the outer electric machine rotor, the drive train including a first tower shaft, a first drive shaft, a first angled gear box, a second tower shaft, and a second drive shaft, the first tower shaft coupled with the HP spool, the first tower shaft rotatable about a first tower shaft rotational axis, the first drive shaft operably coupled with the inner electric machine rotor, the first drive shaft rotatable about a first drive shaft axis transverse to the first tower shaft rotational axis, the first angled gear box including a first angled gear assembly coupling the first tower shaft with the first drive shaft, the second tower shaft coupled with the LP spool, the second tower shaft rotatable about a second tower shaft rotational axis, the second drive shaft operably coupled with the second tower shaft and the outer electric machine rotor, the second drive shaft rotatable about a second drive shaft rotational axis transverse to the second tower shaft rotational axis.

18. The aircraft propulsion system of claim 17, wherein the first angled gear assembly couples the second tower shaft with the second drive shaft.

19. The aircraft propulsion system of claim 18, wherein the first tower shaft rotational axis and the second tower shaft rotational axis are colinear, and the first tower shaft and the second tower shaft are concentric.

20. The aircraft propulsion system of claim 17, wherein the drive train further includes a second angled gear box, the second angled gear box includes a second angled gear assembly, and the second angled gear assembly couples the second tower shaft with the second drive shaft.

\* \* \* \* \*